United States Patent [19]

Sharma et al.

[11] Patent Number: 5,450,359
[45] Date of Patent: Sep. 12, 1995

[54] ANALOG VIDEO INTERACTIVE (AVI) PC ADD-ON CARD FOR CONTROLLING CONSUMER GRADE VHS-VCR

[75] Inventors: Yogesh K. Sharma; Rajesh Gera; Gajendra P. Singh, all of New Delhi, India

[73] Assignee: National Informatics Centre, Government of India, New Delhi, India

[21] Appl. No.: 125,268

[22] Filed: Sep. 23, 1993

[51] Int. Cl.⁶ .............................................. G06F 17/00
[52] U.S. Cl. ................... 364/514 R; 364/188; 340/825.24
[58] Field of Search ............ 364/514, 232.4, 238, 364/238.1, 188; 395/155, 153, 154; 370/119; 348/734; 455/6.3, 2; 340/825.24

[56] References Cited

U.S. PATENT DOCUMENTS

| | | | |
|---|---|---|---|
| 4,855,746 | 8/1989 | Stacy | 348/734 |
| 4,943,963 | 7/1990 | Waechter et al. | 455/2 |
| 5,065,235 | 11/1991 | Iijima | 455/6.3 |
| 5,086,385 | 2/1992 | Launey et al. | 364/188 |
| 5,170,252 | 12/1992 | Gear et al. | 348/734 |
| 5,291,343 | 3/1994 | Goto | 348/734 |
| 5,327,230 | 7/1994 | Dockery | 455/6.3 |

OTHER PUBLICATIONS

Resolution Magazine, Mar./Apr. 1992, vol. 3, No. 2, p. 14, describing NEC-PC-VCR.
DQ-422 videographics interface listing some supporting models of profession grade VCR's (1993).
AimTech Corporation, "Author" software (1993).

Primary Examiner—Ellis B. Ramirez
Attorney, Agent, or Firm—Lowe, Price, LeBlanc & Becker

[57] ABSTRACT

PC Add-On Card for controlling consumer grade VHS-VCR(s) comprising address decoding section and bidirectional buffer connected to I/O ports for interchanging data between computer and VHS-VCR(s) through digital switching control and to counter section for counting tape positioning pulses from the VHS-VCR(s) through analog multiplexer section. The digital switching control section and analog function switching control electronically control the functions of VHS-VCR(s) through the analog multiplexer section interactively. This Card may be used for integrating real time analog video from a built-in VHS-VCR and animation from the computer in Analog Video Interactive Equipment.

11 Claims, 3 Drawing Sheets

ANALOG VIDEO INTERACTIVE (AVI) PC ADD-ON CARD FOR CONTROLLING CONSUMER GRADE VHS-VCR

This invention relates to Analog Video Interactive (AVI) PC Add-On Card for controlling consumer grade VHS-VCR.

BACKGROUND

Controlling professional VCR (s) for instance U-matic VCR(s), Beta-cam VCR(s) or S-VHS-VCR(s) through computers is known, as the said VCR(s) have in-built circuitry to be interfaced with computers. The said in-built circuitry is an integrated part of the system and is functional only with its own system. Furthermore, said VCR(s) are very expensive. Accordingly, there is no separate and independent circuitary with which any VHS-VCR(s) can be interfaced with the computer.

It is therefore, the object of this invention to provide interface in the form of PC Add-On Card between any VHS-VCR and computer for controlling VHS-VCR(s) through computer, thereby, avoiding the limits of the uses, programmability and costs.

To achieve the said objective, this invention provides AVI PC Add-On Card for controlling consumer grade VHS-VCR which comprises:

Address decoder section and bidirectional buffer connected to IBM expansion slot for exchange of information to and from the processor, Input/output (I/O) ports connected to bidirectional buffer, IBM expansion slot and address decoding section for controlling the functions of the VCR(s) and passing the status of the VCR(s) to the processor, Counter section connected to bidirectional butter, address decoding means, IBM expansion slot and (I/O) ports for counting the required number of tape positioning pulses and helping to determine the current status of the VCR(s), Digital switching control section connected to counter means through monostable multivibrator and also to (I/O) ports for giving the stop signal to Analog function switching control whenever terminal count is indicated or when required by the processor, Analog function switching control connected to I/O ports for switching all the functions of VCR's except stop function and digital switching control for switching stop function of VCR(s), Analog multiplexer section connected to said counter section, I/O ports, analog function switching control and VCR port(s) through VCR matrix(ces) for, passing tape positioning pulses to counter section, VCR status information to I/O ports, matrix input scan pulses to analog switching control and matrix(ces) output scan pulses to the VCR port(s), and receiving multiplex control signal from I/O ports, matrix output scan pulses from analog function switching control and matrix input scan pulses from VCR port(s).

The IBM expansion slot is either 8 BIT or 16 BIT connector, and address decoder section consists of 3:8 decoder connected to 8 Bit comparator.

The counter section consists of ÷2/÷25 counter, terminal count indicator, and configurable monostable multivibrator. The input of each of said instruments is connected to tape position pulses from said analog multiplexer section and the outputs to 12 Bit/16 Bit counter, digital switching control through monostable multivibrator and the processor through I/O ports respectively. Audio/Video ports are included through Audio/Video switch control to I/O ports for selecting Audio/Video signals of VCR or PC.

The I/O ports consists of:

12/16 bit input port connected to 12/16 bit counter for passing the present count value of the 12/16 bit counter to the processor through bidirectional buffer.

8 to 16 bit output port connected to analog function switching control and digital switching control through monostable multivibrator to control the switching of VCR's functions and audio/video port through audio/video switching control for selecting audio/video signals of VCR(s) or PC.

8-bit input port connected to analog multiplexer section and the counter means for passing the status of VCR through bidirectional buffer, 4 to 8 bit output port connected to analog multiplexer section for selecting the VCR(s) to be controlled and 12/16 bit counter for controlling the functioning of 12/16 bit counter.

The 12/16 bit counter is provided between ÷2/÷25 counter and 12/16 bit input port for counting the number of tape position pulses from VCR(s) and is controlled by 4 to 8 bit output port.

Astable multivibrator is also connected to configurable monostable multivibrator for providing reference clock which helps in determining the status of VCR.

The invention will now be described with reference to the accompanying drawings.

Figure 1:
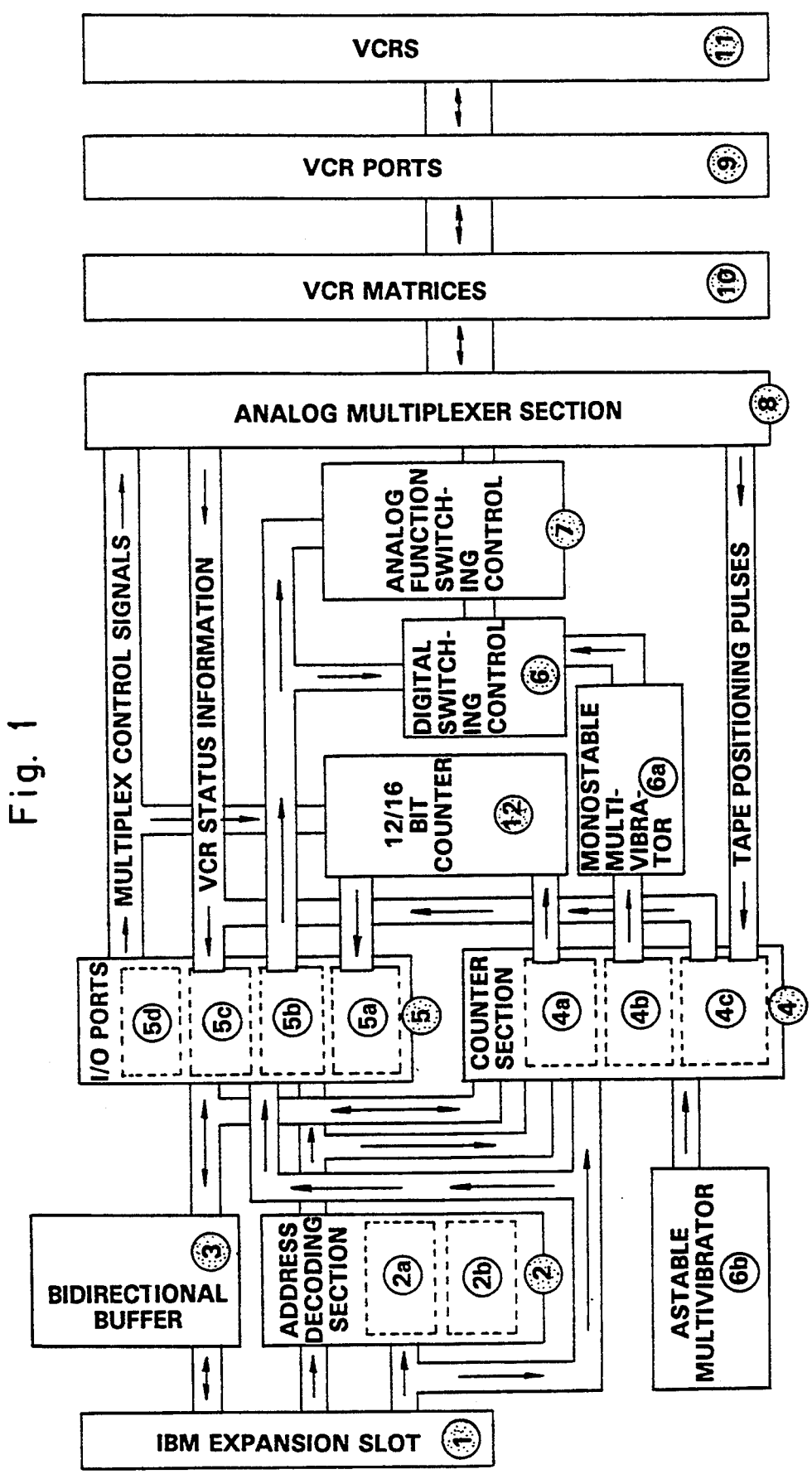
FIG. 1 shows the block diagram of Analog Video Interactive (AVI) PC Add-On Card for controlling consumer grade VHS-VCR according to this invention.
Figure 2:
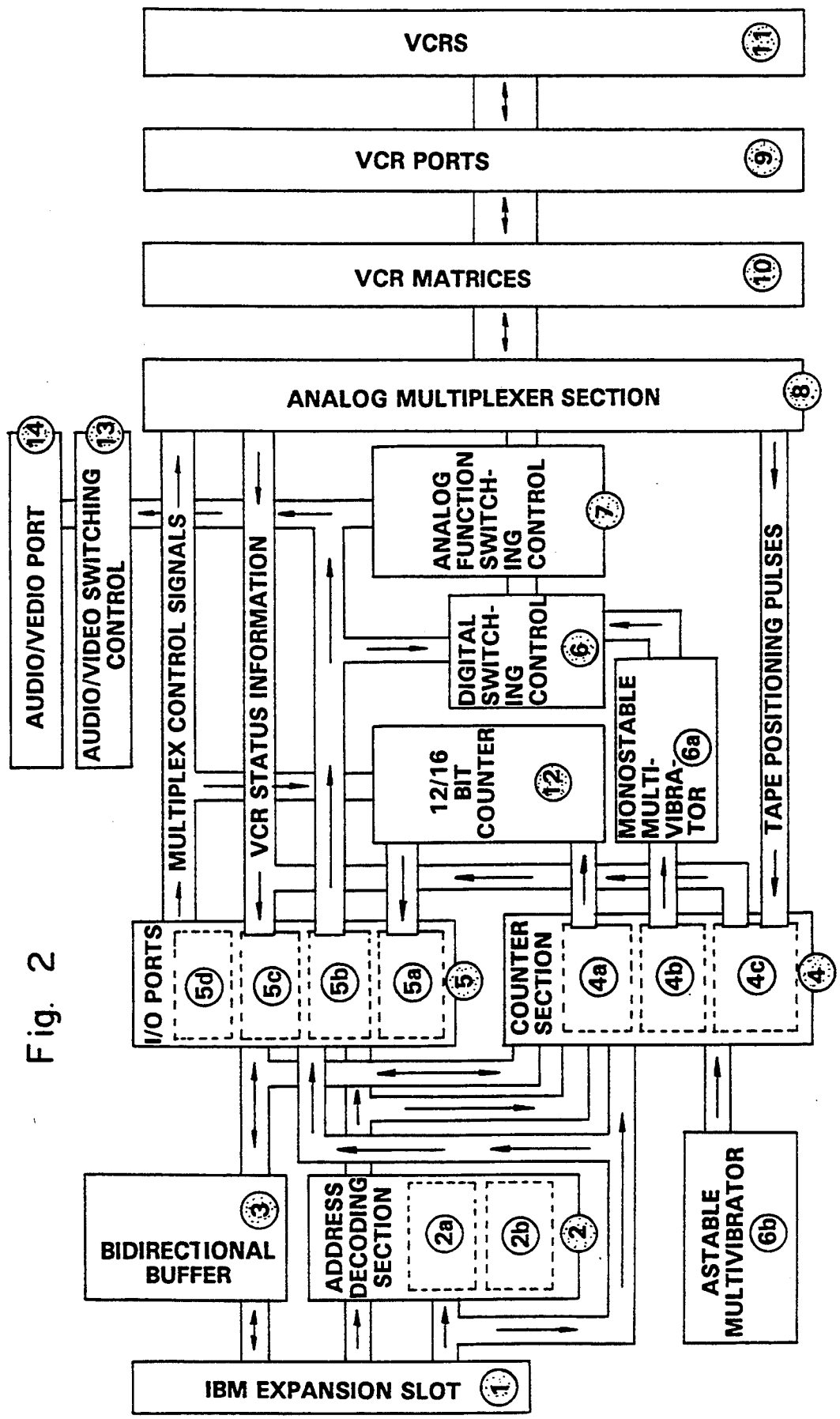
FIG. 2 shows the block diagram of Analog Video Interactive (AVI) PC Add-On Card for controlling consumer grade VHS-VCR with audio/video switching control and audio/video port according to this invention.

Referring to FIGS. 1 & 2, item (1) shows the IBM expansion slot which is either 8 BIT or 16 BIT connector. Address decoder section (2) consisting of 3:8 decoder (2b) and 8-Bit comparator (2a) and bidirectional buffer (3) are connected to said expansion slot (1) for exchange of information to and frown the processor. Counter section (4) consists of ÷2/÷25 counter (4a), terminal count indicator (4b) and configurable monostable multivibrator (4c). This counter section (4) is connected to bidirectional buffer (3), address decoding section (2), IBM expansion slot (1) and I/O ports (5) for counting the required number of tape positioning pulses and helping to determine the current status of the VCR(s). The I/O ports consist of 12/16 bit input port (5a), 8 to 16 bit output port (5b), 8-Bit input port (5c) and 4 to 8 bit output port (5d), 12/16 bit counter [(13) FIG. 1 & (12) FIG. 2] is provided between ÷2/÷25 counter (4a) and 12/16 bit input port (5a) and is controlled by 4 to 8 bit output port (5d). Digital switching control (6) is connected to terminal counter indicator (4b) through monostable multivibrator (6a) and also to 8 to 16 bit output port (5b) for the stop signal to analog function switching control (7) whenever terminal count is indicated or when required by the processor. Analog function switching control (7) is connected to 8 to 16 bit output port(5b) for switching all the functions of VCR(s) except stop function and digital switching control (6) for switching stop function of the VCR(s). Analog multiplexer section (8) is connected to said counter section (4), 8 bit input port (5c), 4 to 8 bit output port (5d) and VCR port (s) (9) through VCR matrix(ces) (10) for passing tape positioning pulses to counter section (4), VCR status information to 8 bit input port (5c), matrix input scan pulses to Analog function switching control (7) and matrix output scan pulses to VCR port(s) (9) and receiving multiplex control signals from 4 to 8 bit output port (5d), matrix output scan pulses from analog switching control (7) and matrix input scan pulses from VCR port(s) (9). The VCR(s) (11) are connected to VCR ports (9). Astable multivibrator (6b) is also connected to configurable monostable multivibrator (4c) for providing reference clock which helps in determining the status of VCR.

Audio/Video port (14) is included through Audio/Video switching Control (13) to 4 to 8 bit output port 5(d) of I/O Ports (5) as shown in FIG. 2 for selecting Audio/Video signals of VCR(s)/PC.

Figure 3:
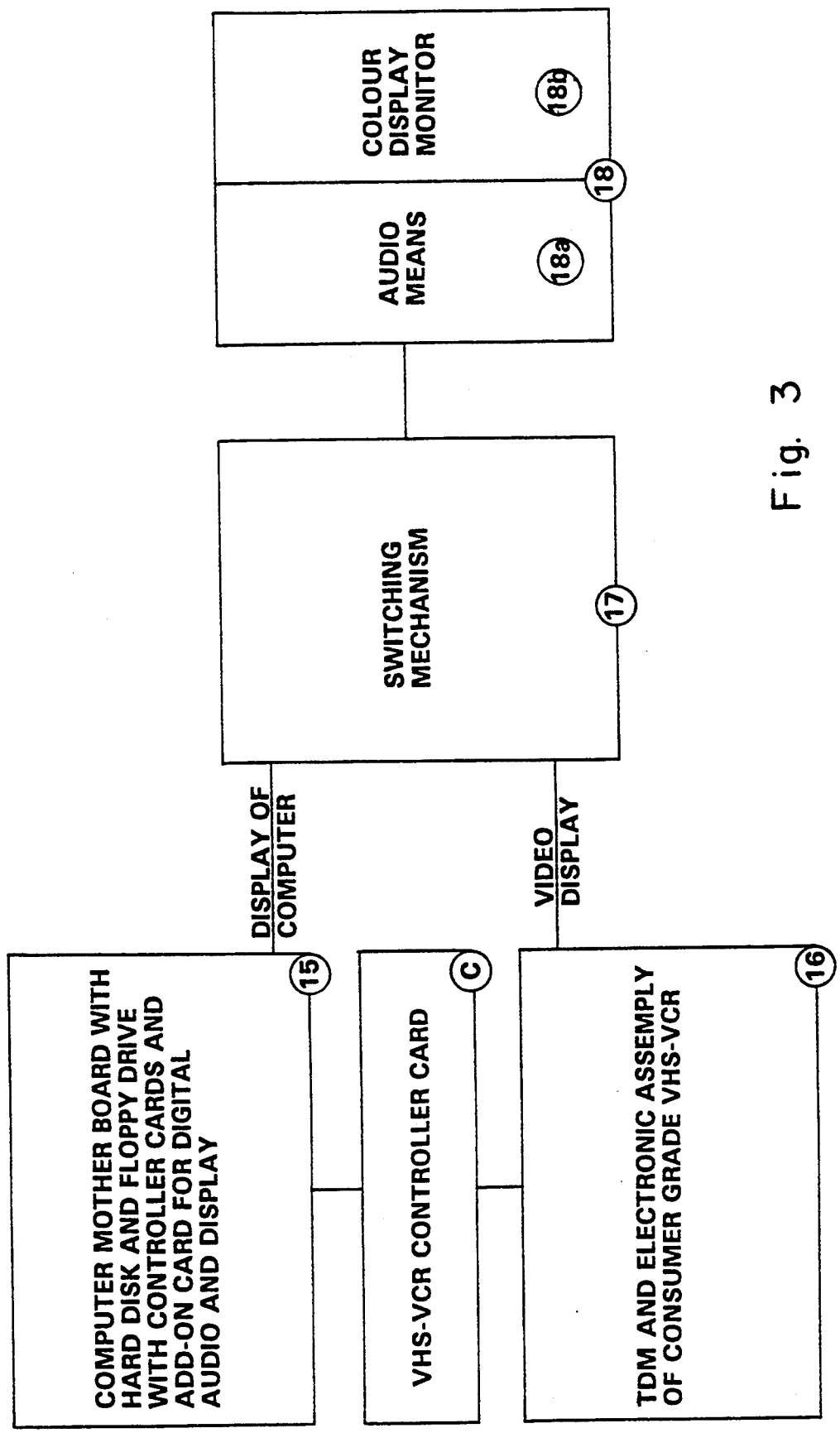
FIG. 3 shows the Analog Video interactive equipment using the PC Add-On Card according to this invention.

WORKING:

The following steps will explain the working of the AVI PC Add-On Card with reference to FIG. 2 & FIG. 3:

Insert the AVI PC Add-On Card (c) in one of the IBM expansion slot (1) of the PC.

Program the PC with the relevant software

Connect the VCR(s) (11) to the available VCR port(s) (9) of the card (c) through cables.

The installation of the card is complete.

The user is required to give his choice of function to be performed by VCR with the desired count numbers (if required), The card will accept the option through the computer program in the PC and will switch that function of the VCR.

The card will ensure the proper functioning of the VCR. In case of error it will raise the error alarm to the user through the software.

In case there is no error, the card will start counting the number of the tape positioning pulses and will stop the VCR if the desired count has reached. After this the card is again ready for another VCR function as desired by the user.

The user always has the right to override any previous function command by giving either stop command or any other function command through the software at any stage.

Advantages

This card can be used with any of the PC, PC/XT or PC/AT.

This card is able to control any consumer grade VHS-VCR.

At a time one or more than one VCR(s) can be connected to the VCR ports.

It does not interfere with the video processing of the VCR or PC.

Accuracy of the control of the functions is not limited by the card. It utilizes the maximum controlling capability possible in the VCR. The overall accuracy of the control is directly dependent upon the VCR being used.

The card is able to recognize a position in the VCR tape relative to the user specified zero position. It means the user has to define the zero of the video tape when he starts the access to the tape.

The card uses less than 16 address positions of the PC from 768 onwards (decimal equivalent of 300 H onwardsonwards). However, it can be changed to the value desired by user.

The processor looks at the whole card as I/O Ports with limited intelligence. However, for the VCRs it is a parallel system control. It should, however, be clear that the overall intelligence of the card depends upon the processor and programming.

Selecting audio/video of PC & VCR with the help of software gives the user the flexibility of choosing a video from VCR while the audio comes from PC & vice versa.

This Card integrates real time analog video from VHS-VCR, digital Audio and animation from a computer in AVI equipment.

In FIG. 3 the application of PC Add-On Card in an Analog video Interactive equipment has been shown. In FIG. 3 item (15) shows the mother board of IBM PC/AT compatable, with hard disc and floppy drive with controller cards and add-on card for digital audio and display. The VHS-VCR controller card (c) is mounted on the said mother board (15). TDM (Tape Drive Mechanism) Assembly and Electronic Assembly of consumer grade VHS-VCR (16) are connected to the said controller card (c). The video output of VHS-VCR and display output of PC/AT are fed to the built-in colour device 18(b) with audio means 18(a) through switching mechanism (17). The provision has also been made to connect colour display and audio means placed outside the equipment. Working of this equipment is as follows:

load DOS and associated application software for instance word star, D-base, windows, story board on the hard disk on computer (15)

load SAVIA software on the hard disc of the computer (15)

load relevant video cassette on the TDM of VHS-VCR (16)

note the starting and end counters of the desired video clipping in the cassette using the SAVIA software.

use SAVIA software to link said video clippings and digital audio with any DOS application to build interactive multimedia application. the VHS-VCR controller card (also known as add-on card for IBM compatable PC-XT/AT) brings any consumer grade VHS-VCR under computer control using custom made software so that any VHS cassette can be indexed and viewed alongwith the computer display. In different configurations of AVI equipment, display device can have digital resolution of 320×200 or 640×480 or 800×600 with 4 to 32768 colours. The digital audio can be mono, sterio, hi-fi sterio and the mother board includes the processor 80286 or 80386.

We claim:

1. AVI PC Add-On Card for controlling consumer grade VHS-VCR comprising:

Address decoding section and bidirectional buffer connected to IBM expansion slot for exchange of information to and from the processor, Input/Output (I/O) ports connected to bidirectional buffer, IBM expansion slot and address decoding section for controlling the functions of the VCR(s) and passing the status of the VCR(s) to the processor, Counter section connected to bidirectional buffer, address decoding section IBM expansion slot and I/O ports for counting the required number of tape positioning pulses and helping to determine the current status of the VCR(s), Digital switching control connected to counter section through monostable multivibrator and also to I/O ports for giving the stop signal to Analog function switching control whenever terminal count is indicated or when required by the processor, Analog function switching control connected to I/O ports for switching all the functions of the VCR(s) except stop function and digital switching stop function of the VCR, Analog multiplexer section connected to said counter section, I/O ports, analog function switching control, and VCR port (s) through VCR matrix (ces) for passing tape positioning pulses to counter section, VCR status information to I/O ports, matrix input scan pulses to analog switching control and matrix output scan pulses to the VCR port(s), and receiving multiplex control signals from I/O ports, matrix output scan pulses from analog function switching control section and matrix input scan pulses from VCR port(s).

2. PC Add-On Card for controlling Consumer Grade VHS-VCR as claimed in claim 1 wherein Audio/Video port is included through audio/video switching control to I/O ports for selecting Audio/Video signals of VCR or PC.

3. PC Add-On Card for controlling consumer grade VHS-VCR as claimed in claim 1 wherein IBM expansion slot is either 8 BIT or 16 BIT connector.

4. PC Add-On Card for controlling consumer grade VHS-VCR as claimed in claim 1 wherein address decoding section consists of 3:8 decoder connected to 8-Bit comparator.

5. PC Add-On Card for controlling consumer grade VHS-VCR as claimed in claim 1 wherein counter section consists of $\div 2/\div 25$ counter, terminal count indicator, and configurable monostable multivibrator, the input of said instruments is connected to tape position pulses from said analog multi plexer section and the output is connected to 12/16 bit counter, digital switching control through monostable multivibrator and the processor through I/O ports respectively.

6. PC Add-On Card for controlling consumer grade VHS-VCR as claimed in claim 1 wherein I/O ports consist of:

12/16 bit input port connected to 12/16 bit counter for passing the present count value of the 12/16 bit counter to the processor through bidirectional buffer, 8 to 16 bit output port connected to Analog function switching control and digital switching control through monostable multivibrator to control the switching of VCR's functions and audio/video port through audio/video switching control for selecting audio/video signals of VCR(s) or PC, 8 bit input port connected to analog multiplexer section and the counter section for passing the status of the VCR(s) through bidirectional buffer to the processor, 4 to 8 bit output port connected to analog multiplexer section for selecting the VCR(s) to be controlled, 12/16 bit counter for controlling the functioning of 12/16 bit counter and audio/video switching control for selecting audio and video signals of VCR or PC.

7. PC Add-On Card for controlling consumer grade VHS-VCR as claimed in claim 1 wherein 12/16 bit counter is provided between $\div 2/\div 25$ counter and 12/16 bit input port for counting the number of tape position pulses from VCR and is controlled by 4 to 8 bit output port.

8. PC Add-On Card as claimed in claim 1 wherein astable multivibrator is connected to configurable monostable multivibrator for providing reference clock which helps in determining the status of VCR.

9. Analog Video Interactive (AVI) equipment comprising:

mother board of IBM PC/AT comparable, with hard disk and floppy drive with controller cards, and add-on card for digital audio and display, PC Add-On Card as claimed in claim 1 mounted on the said mother board for controlling the functions of VHS-VCR.

TDM Assembly and Electronic Assembly of consumer grade VSH-VCR connected to the said PC Add-On Card, The video output of the VHS-VCR and display output of PC/AT are fed to the built-in colour display device with audio means through a switching mechanism which senses the presence of video signal from the said VHS-VCR and automatically displays the video signal alongwith the audio and in the absence of video signal displays the output of the computer.

10. Analog Video Interactive (AVI) equipment as claimed in claim 9 wherein said display device has digital display resolution of 320×200 or 640×480 or 800×600 with 4 to 32768 colours and the said digital audio is mono, stereo or hi-fi stereo.

11. Analog Video Interactive (AVI) equipment as claimed in claim 9 wherein the mother board includes the processor 80286 or 80386.

* * * * *